April 21, 1925.
V. C. FOGELBERG
HIGH PRESSURE LUBRICATING APPARATUS
Filed Aug. 31, 1922
1,534,173
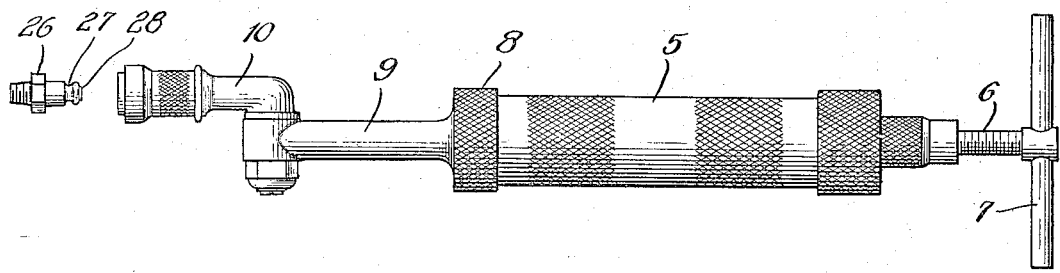
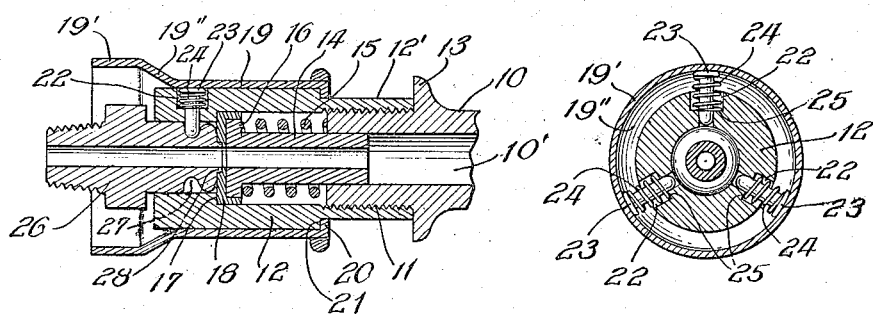

Patented Apr. 21, 1925.

1,534,173

UNITED STATES PATENT OFFICE.

VANUS C. FOGELBERG, OF CHICAGO, ILLINOIS, ASSIGNOR TO E. EDELMANN & CO., OF CHICAGO, ILLINOIS, A CORPORATION OF ILLINOIS.

HIGH-PRESSURE LUBRICATING APPARATUS.

Application filed August 31, 1922. Serial No. 585,345.

*To all whom it may concern:*

Be it known that I, VANUS C. FOGELBERG, a citizen of the United States, residing at Chicago, in the county of Cook and State of Illinois, have invented certain new and useful Improvements in High-Pressure Lubricating Apparatus, of which the following is a specification.

This invention relates to high pressure lubricating apparatus and its object is to provide means of simple construction which can be easily adjusted to supply lubricant under high pressure for lubricating in an efficient manner without loss of lubricant.

A further object of the invention is to provide means for attaching a grease gun to a fitting quickly and securely so that lubricant can be forced in to the fitting under high pressure and without leakage.

And a further object of the invention is to dispense with the flexible hose commonly employed in connection with grease guns and to provide swivel means to facilitate the application of the grease gun to fittings disposed at different locations more or less difficult of access around and about machines such as automobiles, motor trucks and the like.

The invention has other objects in view which will appear hereinafter in the detail description of that embodiment which has been selected for illustration in the accompanying drawings and referring thereto—

Fig. 1 is a plan view of the grease gun and a fitting adapted to receive the same;

Fig. 2 is a longitudinal sectional view of the swivel end of the grease gun showing it being applied to a fitting and near final position;

Fig. 3 is also a longitudinal sectional view showing the end of the grease gun in operative position relative to the fitting and locked thereto;

Fig. 4 is a transverse sectional view on the line 4—4 of Fig. 2.

Referring to the drawings 5 is the barrel of the grease gun and it is provided interiorly with a plunger of any suitable character carried by the screw stem 6 which is adapted to be operated through the medium of the handle 7 for moving the plunger forward in the barrel to force grease therefrom, or to withdraw the plunger in the barrel to permit the barrel to be refilled with grease. The end cap 8 is provided with a tubular extension 9 and an angular arm 10 has a swivel connection of any suitable form with the end of said tubular extension. The outer end of the angular arm is reduced in diameter and threaded at 11 to receive a threaded guide 12 of cylindrical form which is screwed on to the reduced end 11 against the shoulder 13. A tubular plunger 14 within the guide 12 has its end arranged to slide in the bore 10' of the arm 10, and a spring 15 arranged between the end of said arm and a peripheral flange 16 on the plunger normally tends to thrust the plunger outward against a shoulder 17 on the guide. A leather cup washer 18 is arranged on the flanged outer end of the plunger and is provided with an opening to correspond with the bore of the plunger. A sleeve 19 is slidably mounted on the guide and it is provided at its inner end with an interior flange 20 which travels on the reduced end 12' of the guide and engages the shoulder 21 which forms a stop to limit the outward movement of the sleeve. This sleeve is flared or enlarged at its outer end and is provided with the enlarged outer cylindrical portion 19' and the inclined portion 19''. The guide is provided with a plurality of counter sunk openings 22 extending radially therethrough and adapted to receive the headed pins 23. Springs 24 are arranged on the pins to bear against the heads and the shoulders 25 to normally project the pins outward clear of the bore in the guide and with their heads in contact with the sleeve.

The tubular fitting 26 is provided with a peripheral groove 27 and with an annular flange 28 at its outer end to engage the washer 18.

In practice the angular arm 10 is arranged in convenient relation to the fitting and the guide is slipped over the end of the fitting until its outer end is engaged with the plunger. Then the sleeve which is normally in retracted position, as shown in Fig. 2, is pressed forward to the position shown in Fig. 3 and during its sliding movement on the guide the inclined part 19'' engages the heads of the spring pressed pins and forces them inward into the annular groove 27 in the fitting. At the same time the fitting is pressed snugly against the leather washer of the plunger and the plunger is pressed by its spring tightly against the fitting to make a grease tight joint between the plunger and the fitting so that grease may be forced from the gun into the fitting without leakage at the connection. The bore 10' is of sufficient diameter to receive the plunger and there will be considerable pressure of the grease against the inner end of the plunger which will force the plunger against the fitting and assist in producing a leak-tight connection. Thus the connection between the gun and the fitting becomes tighter as the pressure on the grease increases and thereby a connection is made which will prevent leakage of grease under all usual conditions. To force the grease from the gun into the fitting the handle 7 is turned to project the piston forward in the barrel, in the usual manner, and the construction is such that sufficient pressure may be easily produced to discharge the grease through the fitting into the bearing which it is designed to lubricate.

The invention is designed primarily for use in lubricating automobiles and motor trucks where the fittings are sometimes disposed in places not easily accessible and the swivel arm provides a convenient means for adjusting the gun to the fitting and the extension 9 and arm 10 form a desirable conduit for the flow of the grease and of sufficient rigidity to withstand the handling and operation of the gun.

After the gun has been operated the sleeve is simply retracted from the position shown in Fig. 3 to the position shown in Fig. 2 during which the springs withdraw the locking pins from engagement with the fitting and then the gun can be withdrawn from the fitting and it is ready for use on another fitting. The construction is such that the application of the gun to the fitting is very simple and easy and the adjustment of the gun to the fitting in different positions in different locations can be very easily effected.

I may use any sort of swivel connection between the arm and the extension but I have found it satisfactory to provide a round key union, as shown, wherein the passage 9' of the extension communicates with an annular groove 26 in the arm and the latter communicates through a transverse passage 29 with the bore 30 which connects with the large bore 10'. Thus the passages 9' and 30 will be in communication in any adjustment of the arm relative to the extension of the gun so that an unterrupted flow of grease may be produced when required. I prefer this swivel construction because I have found it satisfactory in practice but other forms may be used if desired.

I have used the expression "grease gun" in the foregoing description in its general commercial sense and it will be understood that the invention may be used for supplying grease, heavy oil or any other lubricant which can be used in an apparatus of this kind.

I am aware that changes in the form, proportion and construction of parts may be made without departing from the spirit or sacrificing the advantages of the invention and I reserve the right to make all such changes as fairly fall within the scope of the following claims.

I claim:

1. A lubricating apparatus comprising a gun, and means for connecting the gun to a fitting comprising a discharge member having a passage therein, a guide on said member, a tubular plunger arranged within the guide to make discharge connection with the fitting, a pin movable in the guide, a spring on the pin for normally holding it out of locking position, and means on the guide for thrusting the pin into locking engagement with the fitting.

2. A lubricating apparatus comprising a gun, and means for connecting the gun to a fitting comprising a discharge member having a passage therein, a guide on said member, means within the guide to make discharge connection with the fitting, a pin movable in the guide, and a sleeve slidable on the guide for moving the pin into locking engagement with the fitting.

3. A lubricating apparatus comprising a gun, and means for connecting the gun to a fitting comprising a discharge member having a passage therein, a guide on said member, means within the guide to make discharge connection between the member and the fitting, a pin movable in the guide, and a sleeve having a flared end slidable on the guide to thrust the pin into locking engagement with the fitting.

VANUS C. FOGELBERG.